US011893899B2

(12) United States Patent
Zacharias et al.

(10) Patent No.: US 11,893,899 B2
(45) Date of Patent: Feb. 6, 2024

(54) COGNITIVE ANALYSIS OF DIGITAL CONTENT FOR ADJUSTMENT BASED ON LANGUAGE PROFICIENCY LEVEL

(71) Applicant: International Business Machines Corporation, Armonk, NY (US)

(72) Inventors: Shinoj Zacharias, Bangalore (IN); Smitha Tv, Bangalore (IN); Amit Mane, Bangalore (IN); Vivin Krishnan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 17/301,380

(22) Filed: Mar. 31, 2021

(65) Prior Publication Data

US 2022/0319351 A1   Oct. 6, 2022

(51) Int. Cl.
| | |
|---|---|
| G09B 19/00 | (2006.01) |
| G06F 40/242 | (2020.01) |
| G06F 40/289 | (2020.01) |
| G06F 40/166 | (2020.01) |

(52) U.S. Cl.
CPC .......... *G09B 19/00* (2013.01); *G06F 40/166* (2020.01); *G06F 40/242* (2020.01); *G06F 40/289* (2020.01)

(58) Field of Classification Search
None
See application file for complete search history.

(56) References Cited

U.S. PATENT DOCUMENTS

| 9,262,405 | B1 | 2/2016 | Baliga | |
|---|---|---|---|---|
| 9,680,945 | B1 * | 6/2017 | Treves | ................... H04W 4/21 |
| 10,410,539 | B2 | 9/2019 | Nielson | |
| 10,902,197 | B1 * | 1/2021 | Lakshmanan | ......... G06F 40/205 |

(Continued)

OTHER PUBLICATIONS

Kajiwara, et al. "Building a monolingual parallel corpus for text simplification using sentence similarity based on alignment between word embeddings." In Proceedings of COLING 2016, the 26th International Conference on Computational Linguistics: Technical Papers, pp. 1147-1158. 2016. (Year: 2016).*

(Continued)

*Primary Examiner* — Frank D Mills
(74) *Attorney, Agent, or Firm* — Michael A. Petrocelli

(57) ABSTRACT

A computer adjusts digital content to match a user language proficiency level. The computer receives digital content including words and monitors word consumption activity of a user. The computer identifies troublesome words associated with content consumption delays and establishing a user language proficiency level based on a difficulty value associated with said troublesome words. The computer identifies content words having difficulty level above the language proficiency level. The computer identifies from a word corpus, exchange candidate words having a difficulty level equal to or below said language proficiency level. The computer generates using a natural language processing (NLP) algorithm, word embeddings for said target words and said exchange candidate words. The computer selects from the exchange candidate words, replacement words having word embeddings substantially the same as the word embeddings of said target words. The computer adjusts content by replacing the target words with the replacement words.

20 Claims, 7 Drawing Sheets

(56) References Cited

U.S. PATENT DOCUMENTS

| | | | |
|---|---|---|---|
| 2003/0152894 A1 | 8/2003 | Townshend | |
| 2014/0335483 A1 | 11/2014 | Buryak | |
| 2015/0310002 A1* | 10/2015 | Yu | G06F 40/30 |
| | | | 707/750 |
| 2016/0180248 A1 | 6/2016 | Regan | |
| 2018/0267954 A1* | 9/2018 | Catalano | H04L 51/52 |
| 2019/0114300 A1* | 4/2019 | Miltsakaki | G06F 40/216 |
| 2019/0197119 A1* | 6/2019 | Zhang | G06F 16/35 |
| 2020/0007946 A1 | 1/2020 | Olkha | |
| 2021/0004437 A1* | 1/2021 | Zhang | G06F 40/205 |

OTHER PUBLICATIONS

Alva-Manchego, et al. "Learning how to simplify from explicit labeling of complex-simplified text pairs." In Proceedings of the Eighth International Joint Conference on Natural Language Processing (vol. 1: Long Papers), pp. 295-305. 2017. (Year: 2017).*

"A system to facilitate the reading of materials in foreign language", An IP.com Prior Art Database Technical Disclosure, Disclosed Anonymously, IP.com No. IPCOM000254139D, IP.com Electronic Publication Date: Jun. 5, 2018, 5 pages, <https://priorart.ip.com/IPCOM/000254139>.

"Gamification of E-Readers for More Users and Increased Revenue From Books", An IP.com Prior Art Database Technical Disclosure, Disclosed Anonymously, IP.com No. IPCOM000255525D, IP.com Electronic Publication Date: Sep. 29, 2018, 9 pages, <https://priorart.ip.com/IPCOM/000255525>.

"System and Method for Better Reading and Understanding in an EReader", An IP.com Prior Art Database Technical Disclosure, Disclosed Anonymously, IP.com No. IPCOM000240249D, IP.com Electronic Publication Date: Jan. 15, 2015, 3 pages, <https://priorart.ip.com/IPCOM/000240249>.

Mell, et al., "The NIST Definition of Cloud Computing", National Institute of Standards and Technology, Special Publication 800-145, Sep. 2011, 7 pages.

* cited by examiner

COGNITIVE ANALYSIS OF DIGITAL CONTENT FOR ADJUSTMENT BASED ON LANGUAGE PROFICIENCY LEVEL

BACKGROUND

The present invention relates generally to the field of providing digital content, and more specifically, to providing digital content suitable for the language proficiency of a given user by using cognitive analysis.

Reading books and other educational materials can help us learn and acquire knowledge. Reading other materials, such as material written for entertainment, can excite our imaginations. These materials are available for consumption (e.g., listening, reading, etc.) in a wide variety of formats, including paper books, e-books, audio books, and so forth.

Unfortunately, reading skill and comprehension levels can vary from person to person, and not all readers are able to appreciate all levels of content. For example, a person with a low language proficiency (i.e., a low language comprehension level) may find it difficult to comprehend or appreciate book readers with higher comprehension levels are able to enjoy.

It is difficult for readers (or listeners, in the case of content presented in audio-based formats) with a low proficiency in language to completely understand books or other materials that are presented using advanced language, and completely understanding the message being conveyed in those may takes extended periods of time and may require the assistance of one or more reference resources (e.g., a dictionary, thesaurus, etc.). Switching between resource material and a work being read breaks the flow of reading and can be particularly troublesome for reader tying to enjoy recreational literature or learn from instructional material written in language beyond the reader's comprehension level.

SUMMARY

In embodiments according to the present invention, a computer implemented method to adjust digital content to match a determined user language proficiency level, includes receiving, by a computer, digital content including words. The computer monitors word consumption activity of a user. The computer, in response to the monitoring, identifies, troublesome words associated with content consumption delays and establishes a user language proficiency level based, at least in part, on a difficulty value associated with said troublesome words. The computer identifies as target words, words within said content that have a difficulty level above said language proficiency level. The computer, in response to the target word identification, identifies from a word corpus available to the computer, exchange candidate words having a difficulty level equal to or below said language proficiency level. The computer generates, using a natural language processing (NLP) algorithm, word embeddings for said target words and said exchange candidate words. The computer selects from the exchange candidate words, replacement words having word embeddings substantially the same as the word embeddings of the target words. The computer adjusts the content by replacing the target words with the replacement words. According to aspects of the invention, the computer identifies a target word phrase within said target words. The computer assembles exchange candidate word groups from the exchange candidate words. The computer generates, using a natural language processing (NLP) algorithm, word embeddings for the target word phrase and the exchange candidate word groups. The computer selects from the exchange candidate word groups, a replacement word phrase having a word embedding substantially the same as the target word phrase embedding. The computer adjusts the content by replacing the target word phrase with the replacement word phrase. According to aspects of the invention, the consumption delays are actions selected from a group consisting of consulting a dictionary available to the computer, consuming a selected portion of content multiple times, and spending an amount of time to consume a portion of content that exceeds a trigger threshold. According to aspects of the invention, the user language proficiency level is a value selected from a group consisting of a highest difficulty value associated with the troublesome words, a lowest difficulty value associated with the troublesome words, and an difficulty value associated with the troublesome words. According to aspects of the invention, the language proficiency level is based, at least in part, on a word difficulty level associated with social media content generated by the user and available to the computer. According to aspects of the invention, the content adjustment occurs in response to an adjustment trigger event selected from a group of events consisting of a user request, and a quantity of trigger words exceeding a predetermined trigger word quantity threshold. According to aspects of the invention, establishing of the proficiency level is based, at least in part, on comparison to a previously-stored historic proficiency level associated with the user.

In another embodiment of the invention, a system to adjust digital content to match a determined user language proficiency level, which includes: a computer system comprising a computer readable storage medium having program instructions embodied therewith, the program instructions executable by a computer to cause the computer to: receive digital content including words; monitor word consumption activity of a user; responsive to said monitoring, identify troublesome words associated with content consumption delays and establish a user language proficiency level based, at least in part, on a difficulty value associated with said troublesome words; identify words within said content that have a difficulty level above said language proficiency level; responsive to said target word identification, identify from a word corpus available to said computer, exchange candidate words having a difficulty level equal to or below said language proficiency level; generate using a natural language processing (NLP) algorithm, word embeddings for said target words and said exchange candidate words; select from the exchange candidate words, replacement words having word embeddings substantially the same as the word embeddings of said target words; and adjust said content by replacing the target words with the replacement words.

In another embodiment of the invention, a computer program product to adjust digital content to match a determined user language proficiency level includes: a computer system comprising a computer readable storage medium having program instructions embodied therewith, the program instructions executable by a computer to cause the computer to: receive, using a computer, digital content including words; monitor, using the computer, word consumption activity of a user; responsive to said monitoring, identify, using the computer, troublesome words associated with content consumption delays and establish a user language proficiency level based, at least in part, on a difficulty value associated with said troublesome words; identify, using the computer, words within said content that have a difficulty level above said language proficiency level;

responsive to said target word identification, identify from a word corpus available to said computer, exchange candidate words having a difficulty level equal to or below said language proficiency level; generate, using the computer, using a natural language processing (NLP) algorithm, word embeddings for said target words and said exchange candidate words; select, using the computer, from the exchange candidate words, replacement words having word embeddings substantially the same as the word embeddings of said target words; and adjust, using the computer, said content by replacing the target words with the replacement words.

The present disclosure recognizes and addresses the shortcomings and problems associated with converting digital contents to match a language proficiency level of a user (e.g., a reader or listener) using cognitive methods, and in an embodiment, aspects of the invention adjust digital material content to match the language proficiency of the user.

Aspects of the invention convert text and spoken words in digital content (e.g., in digital text, digital audio, and so forth) to accommodate the language proficiency of a reader or listener so that the user understands the book with a minimum of difficulty.

Aspects of the invention convert text and spoken words in digital content with an initial difficulty level into a different difficult level, as needed to accommodate the language proficiency of the reader or listener, so the user can process or consume the content without interrupting the flow of the reading for frequent reference to a dictionary.

Aspects of the invention progressively learn the improvements in language proficiency of a reader and adjust the text and spoken words in digital content (e.g., including digital text, digital audio, and so forth) to dynamically accommodate the language proficiency of the reader/listener to match a current proficiency.

Aspects of the present invention recommend user-personalized conversion of digital materials such a e-books, audio books and other digital content based on language proficiency of the reader or listener.

Aspects of the invention cognitively determine language proficiency by monitoring usage patterns for integrated dictionary (or other reference) applications associated with content display device, by tracking reading pace for a given portion of content, and iteratively updating proficiency assessments and language recommendations over time. Some aspects of the invention note when incorporated reference resources (e.g., a dictionary or thesaurus) are consulted while reading or listening to presented digital content (e.g., an electronic book or other document). Other aspects of the invention note when voice enabled controls are used to request word definition assistance.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are set forth as below as.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a participant" includes reference to one or more of such participants unless the context clearly dictates otherwise.

Figure 1:
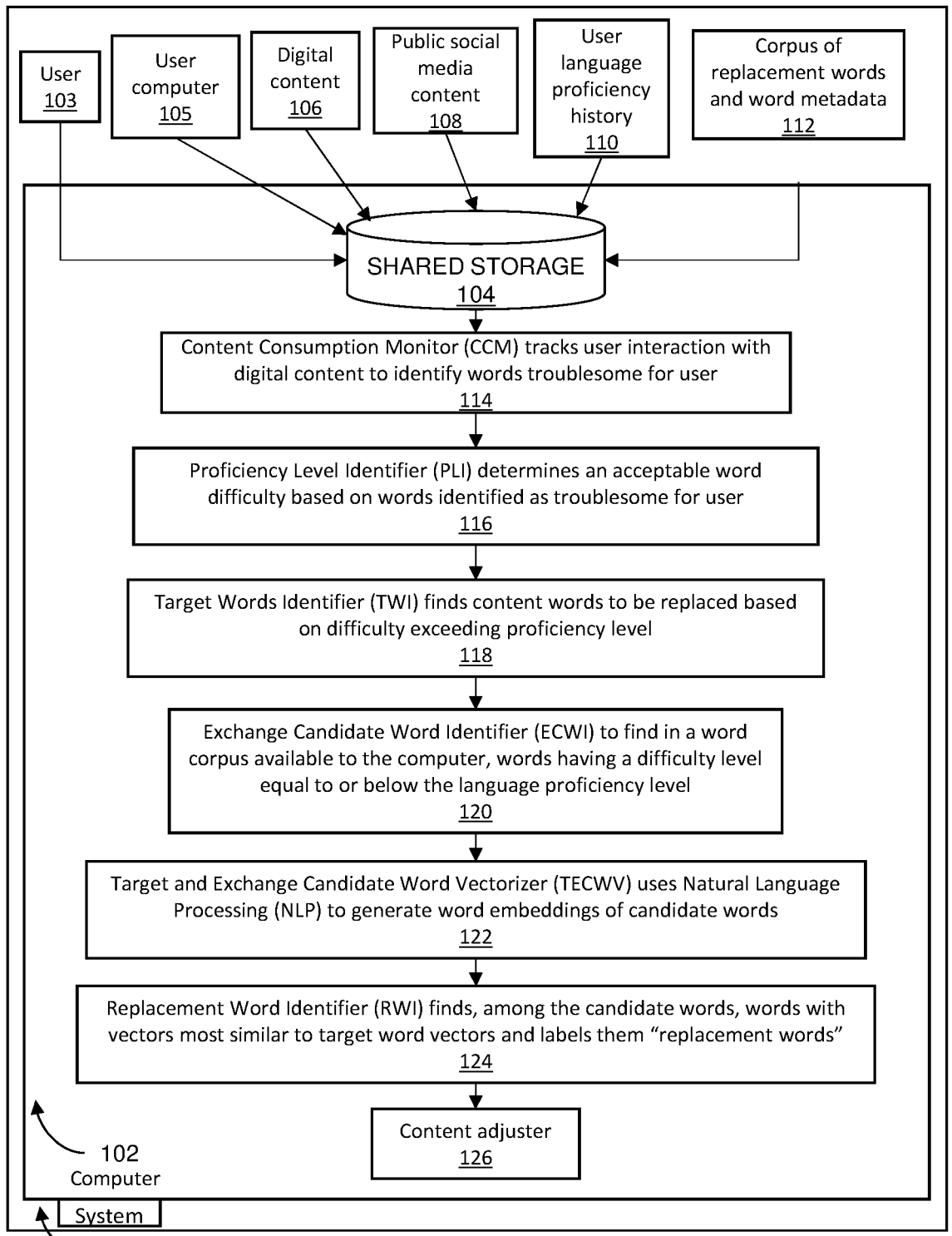
FIG. 1 is a schematic block diagram illustrating an overview of a system for a computer implemented method for adjusting digital content to match a determined audience language proficiency level, according to embodiments of the present invention.
Figure 2:
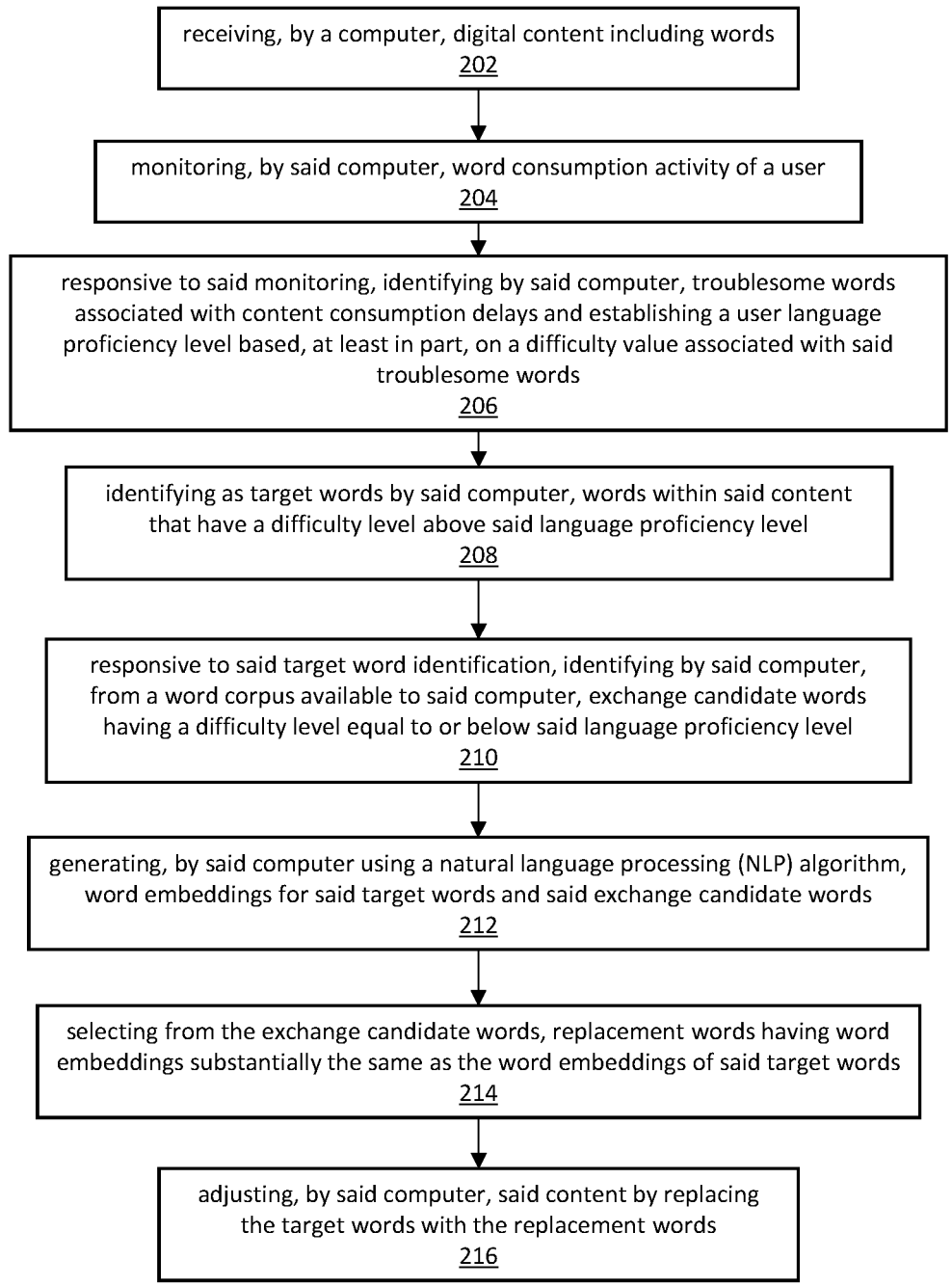
FIG. 2 is a flowchart illustrating a method, implemented using the system shown in FIG. 1, of adjusting digital content to match a determined audience language proficiency level, according to embodiments of the present invention.

Now with combined reference to the Figures generally and with particular reference to FIG. 1 and FIG. 2, an overview of a method to adjust digital content to match a determined audience language proficiency level usable within a system 100 as carried out by a server computer 102 having optionally shared storage 104. According to aspects of the invention, the server computer 102 is in operational communication with a source of digital content 106 (e.g., such digital books or other electronic media containing words presented at given proficiency level (e.g. reading comprehension difficulty level). The server computer 102 is also in communication with a source of social media content 108 (e.g., such as "tweets" in the media feed known as "Twitter", public forum comments, user blogs, or other public-facing online digital media) generated by a selected reader or listener (e.g., a user 103 or digital content consumer) on a user computer 105. The server computer 102 is in communication with a source of user language proficiency history 110 (e.g., user historical reading comprehension levels that are archived and periodically updated). The server computer 102 is in communication with a source of replacement words and word metadata 112 (e.g., a collection of words with associated word information, including definitions, word difficulty levels, and related difficulty calculation factors) that can reveal word difficulties directly (e.g., indications of accepted grade levels for words) and provide information from which a difficulty ratings can be calculated (e.g., grammatic, pronunciation, and other dimensions that make a given word easier or harder to understand). While many sources could suffice to provide information about replacement words and word metadata, pretrained library datasets (such as those publicly available form online sources, such as Google) could provide satisfactory replacement words word difficulty calculation factors, and other associated metadata) for use with aspects of the present invention.

The server computer includes a Content Consumption Monitor (CCM) 114 that tracks the behavior of a user (e.g., a reader or listener) 103 while consuming (e.g., reading, listening to, or otherwise interacting with) the digital content 106. According to aspects of the invention, when the CCM 114 notes that a user is exhibiting certain behaviors when reading or hearing certain words (e.g., referring to an associated dictionary, thesaurus, or other reference to find the meaning or context of a word, reading or listening to a certain word or word group repeatedly, or spending an inordinately-long (e.g., above a trigger threshold of 50% longer than other words or word groups of similar length) period of time processing a certain word or word group compared to other words or word groups), the CCM 112 notes that the being read, heard, or otherwise being consumed and identifies those words as troublesome for the user.

The server computer 102 includes a Proficiency Level Identifier (PLI) 116 which receives a list of troublesome words from the CCM 112, and the PLI uses this information to establish an acceptable word difficulty based on words identified as troublesome for the user. In an embodiment, the PLI 116 uses information from the word metadata to identify the difficulty level associated with the troublesome words for the user 103 being monitored. According to aspects of the invention, the PLI 116 determines an acceptable word difficulty based on words identified as troublesome for the user 103 and determines an associated user language proficiency level. In an embodiment, the PLI 116 identifies the lowest difficulty value (e.g., high school senior) associated with the troublesome words, and assigns that value as the user language proficiency level. In other embodiments, the PLI 116 may assign a language proficiency level for a user 103 based on an average of troublesome word difficulties, a highest troublesome word difficulty value, or some other value associated with the difficulty of the words identified by the CCM as 114 as troublesome words.

The server computer 102 includes Target Words Identifier (TWI) 118 that finds words within the digital content 106 having word difficulty exceeding the user proficiency level. The server computer 102 includes an Exchange Candidate Word Identifier (ECWI) 120 to find in the corpus of replacement words 112, words having a difficulty level equal to or below the user language proficiency level. The ECWI 120 improves downstream word replacement speed and computation efficiency by eliminating from consideration all words that will, if chosen as a replacement for current troublesome words, still be difficult for the user 103 to process. Eliminating these too-difficult words from consideration beneficially reduces the computation time need by the system 100 to adjust content to match a user language proficiency level according to aspects of the invention.

The server computer 102 includes Target and Exchange Candidate Word Vectorizer (TECWV) 122 that uses a Natural Language Processing (NLP) routine (e.g., such as Word2vec or similar model) to generate neural word embeddings (e.g., vectors) of target words and exchange candidate words to determine possible replacement options for replacement of the target words. The server computer 102 includes Replacement Word Identifier (RWI) 124 finds candidate words with vectors most similar to target word vectors. In an embodiment, the vectors of the target words and exchange candidate word are compared via cosine similarity measurement, and the RWI labels as "replacement words" the exchange candidate word having a highest vector cosine similarity with the target word vectors. It is noted that many substitute exchange candidate words may exist (e.g., those with a cosine similarity exceeding a substantially-similarity threshold of 0.90), and a group of exchange candidate words that are substantially-similar to the target words may be stored in the user language proficiency history 110. Words that are selected as replacement words that improve user 103 response time when selected may be reselected in future content adjustments for the selected user. However, according to aspects of the invention, replacement words that do not improve behavior (e.g., as tracked by CCM 114 are not selected in future content adjustments. By keeping a record or replacement words that are successful and not successful, the system can improve user 103 comprehension beyond that which is accomplished merely by selecting a most-cosine-similar replacement. According to aspects of the invention, strategic use of the user language proficiency history 110 allows the system 100 to cognitively select from among several viable target word replacement options.

The server computer 102 includes a content adjuster 126 that receives the replacement words identified by the RWI 124 and revises the digital content 106 accordingly, swapping target words with replacement words. According to aspects of the invention, the content adjustment occurs automatically, after an assessment period where the server computer 102, via the CCM 114, tracks a round diagnostic user 103 interaction, calculates the replacement words, and sends them to the content adjuster. According to some aspects of the invention discussed below further, the content adjustment takes place in response to a trigger event.

Now with specific reference to FIG. 2, and to other figures generally, a method to adjust digital content to match a determined audience (e.g., a reader, listener, or other user) language proficiency level according to aspects of the invention will be described. The server computer 102, at block 202 receiving digital content 106 (the content can be books or periodicals in various digital formats) including words. It is noted that this content may be called an e-book, even though it is a periodical. It is also noted that the digital content may be an audio book or other audio presentations of digital content containing words.

The server computer 102, via CCM 114 at block 204, monitors word consumption activity of a user. According to aspects of the invention, words for which the user 103 seeks assistance are noted as troublesome words, and the CCM 114 keeps tracks the quantity and frequency of taps from a reader to get the meaning of words (including various phrases and idioms) from an integrated reference (such as a dictionary or thesaurus) in case of e-book. In the case of audio books, the CCM 114 keeps track of frequency of the listener's use of voice enabled controls for words (including requests to repeat various words, phrases, and idioms). According to aspects of the invention, the CCM 114, tracks the system tracks a page read duration. For example, the CCM 114 calculates an average time-to-finish for e-book pages.

According to aspects of the invention, the system keeps track of number of times the user 103 has back-tracked to (e.g., repeated) an already listened to sentence when audio books consumption is tracked. According to aspects of the invention, consulting a dictionary or other reference, repeatedly reading or listening to a certain word or group of words, and taking an extended time to process a selection of content, are all considered consumptions delays.

The server computer 102 passes information about these activities to the Proficiency Level Identifier (PLI) 116 which, at block 206, uses this information to identify actions (such as the delays described above, etc.) that indicate words within the content 106 that have been difficult for the user 103 to process, and the PLI identifies them (e.g., words associated with content consumption delays) as troublesome words accordingly. The PLI 116 establishes a user language proficiency level based, at least in part, on a difficulty value associated with the identified troublesome words (e.g., a maximum established grade level for the troublesome words, a minimum established grade level for the troublesome words, an average of the established grade levels associated with the troublesome words, or some other value based on word information included in the corpus of replacement words and word metadata 112).

The server computer 102, by Target Words Identifier (TWI) 118 at block 208, finds words throughout the content 106 that, due to having a difficulty exceeding proficiency level, should be replaced with easier-to-understand words (e.g., words having a difficulty level equal to or below the user language proficiency level), to improve user comprehension. According to aspects of the invention, the difficulty of words in the content 106 can be determined by reference to the corpus of replacement words and word metadata 112. It is noted that the difficulty level value of words can be found as part of the provided metadata, and any number of known word difficulty assessment tools selected by one skilled in this field may also be used to calculate a refined word difficulty level value.

The server computer 102, via Exchange Candidate Word Identifier (ECWI) 120 at block 210, identifies from the corpus of replacement words and word metadata 112, exchange candidate words having a difficulty level equal to or below said language proficiency level. According to aspects of the invention, by eliminating from consideration all words that will, if chosen as a replacement for current troublesome words, still be difficult for the user 103 to process, the ECWI 120 improves downstream word replacement speed and computation efficiency.

The server computer 102, via Target and Exchange Candidate Word Vectorizer (TECWV) 122 at block 212 generates, using a natural language processing (NLP) algorithm, word embeddings for the target words and the exchange candidate words. In an embodiment, Word2vec or similar known vector generating tool is used to generate the embeddings.

The server computer 102, via Replacement Word Identifier (RWI) 124 at block 214 finds, among the candidate words, words with vectors most similar to target word vectors and labels them replacement words. According to aspects of the invention, the server computer 102 selects from the exchange candidate words, replacement words having word embeddings substantially the same as the word embeddings of said target words. In particular, the server computer 102 conducts a co-sine similarity comparison to determine which exchange candidate word embeddings are most similar to a compared target word embedding, and similarities above 0.90 (e.g., a substantial similarity threshold) are added to the user language proficiency history 110 for future reference in user language proficiency level updating and future replacement word selection.

The server computer 102, via Content adjuster 126 at block 216, adjusts the content 106 by replacing the target words with the replacement words identified by the RWI 124. According to aspects of the invention, the content adjustment can occur automatically. According to some aspects of the invention, content adjustment can occur in response to a trigger event. Adjustment trigger event include user request and a quantity of trigger words exceeding a predetermined trigger word quantity threshold (e.g. 10% of the content consumed during the assessment period, or other amount selected by one skilled in this field).

According to aspects of the invention, the server computer 102 may identify target word phrases within the content to be replaced. In these situations, the sever computer 102 will assemble exchange candidate word groups from the exchange candidate words and will generate, using a natural language processing (NLP) algorithm, word embeddings for the target word phrase and the exchange candidate word groups. In an embodiment, the server computer 102, identifies groups of words arranged as sentences and generates, via Trouble and Exchange Candidate Word Vectorizer (TECWV) 122, a corresponding sentence vector. The server computer 102 will refer to this sentence vector when selecting exchange candidate word groups that match the content and context of the sentence (or word group) being replaced. The server computer 102 will select from the exchange candidate word groups, a replacement word phrase having an embedding substantially the same as the target phrase embedding. Aspects of the invention provide replacement sentences (or other groups of words) that maintain the context and message of the original sentence or word group, while accommodating a current user language proficiency. As described above, embedding similarity is determined via cosine similarity comparison. The server computer 102 will then adjust the content by replacing the target word phrase with the replacement word phrase.

Figure 3:
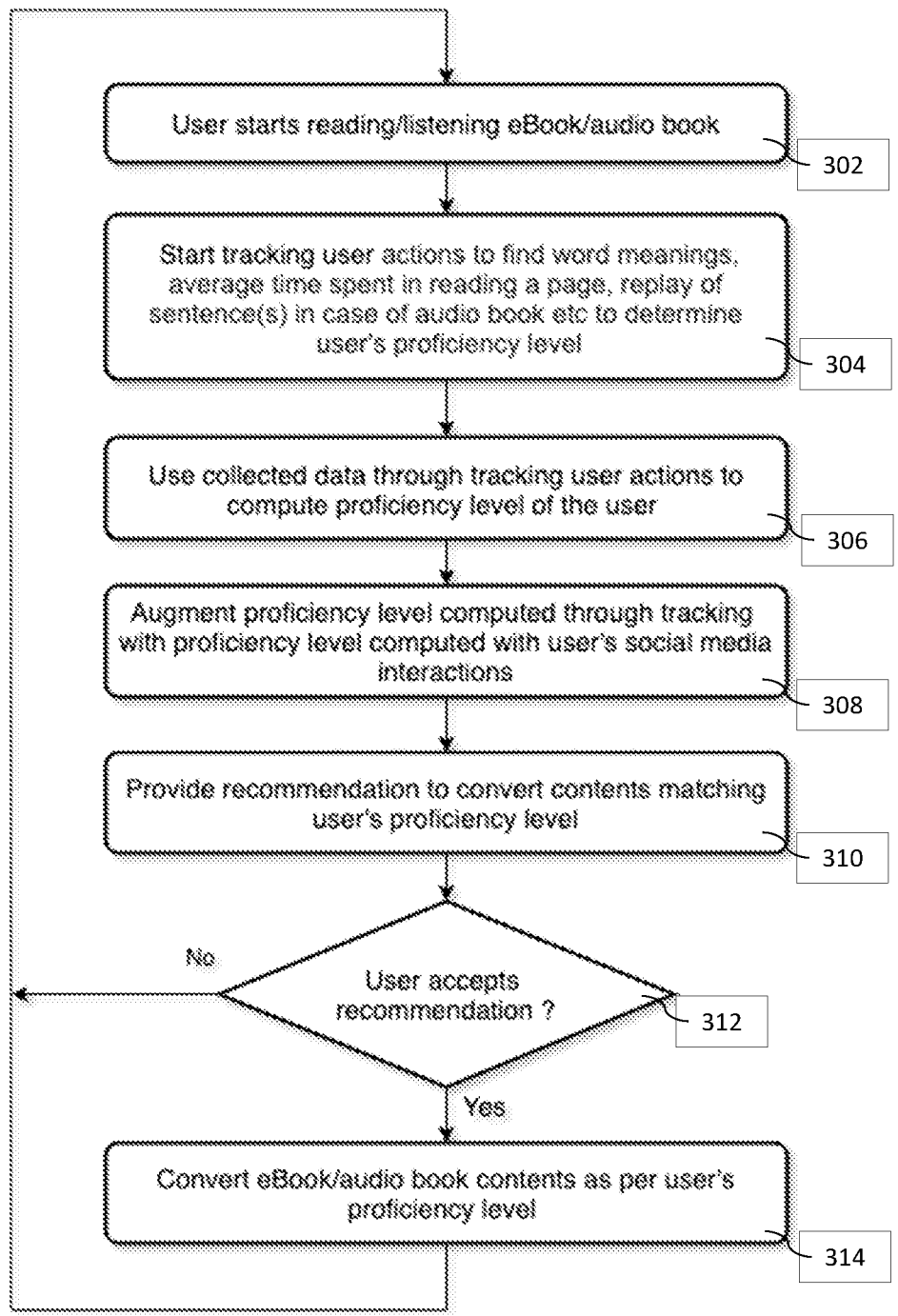
FIG. 3 is flowchart illustrating aspects of a method implemented using the aspects of the system shown in FIG. 1, for adjusting digital content to match a determined audience language proficiency level, according to embodiments of the present invention.

Now, with reference to FIG. 3, aspects of an alternate flow using the system 100 shown in FIG. 1 will be discussed. The server computer 102 at block 302 begins consuming (reading, listening to, etc.) digital content 106. At block 304, the server computer 102 starts tracking aspects of user consumption actions (e.g., actions to find word meanings, average time spent in reading a page, replays of audiobook sentences, etc.) to determine a user proficiency level.

At block 306, the server computer 102 uses data collected during an assessment period (e.g., after consumption of preselected amount of content, such as a single sentence, paragraph, page or other amount of content deemed meaningful to one skilled in this field) to compute the user proficiency level. At block 308, the server computer 102 augments the computed proficiency level through information and content 108 gathered from public-facing social media accounts and interactions for the user. It is noted that the server computer 102 may initiate the content adjustment automatically, however according to some aspects of the invention, the content adjustment occurs in response to a trigger event.

In particular, as shown in blocks 310 and 312, one trigger event is a user 103 acceptance of a recommendation from the server computer to adjust the content to match the user language proficiency. The server computer 102 accepts via user 103 input (e.g., via user computer 105) at block 312 a decision whether to accept the adjustment recommendation. If the user 103 accepts the recommendation, flow continues into block 314, and the server computer 102 adjust the digital content 106 to match the user proficiency level. If the user 103 refuses the recommendation at block 312, flow is returned to block 302 and the system waits for the user to begin consuming new content.

Figure 4:
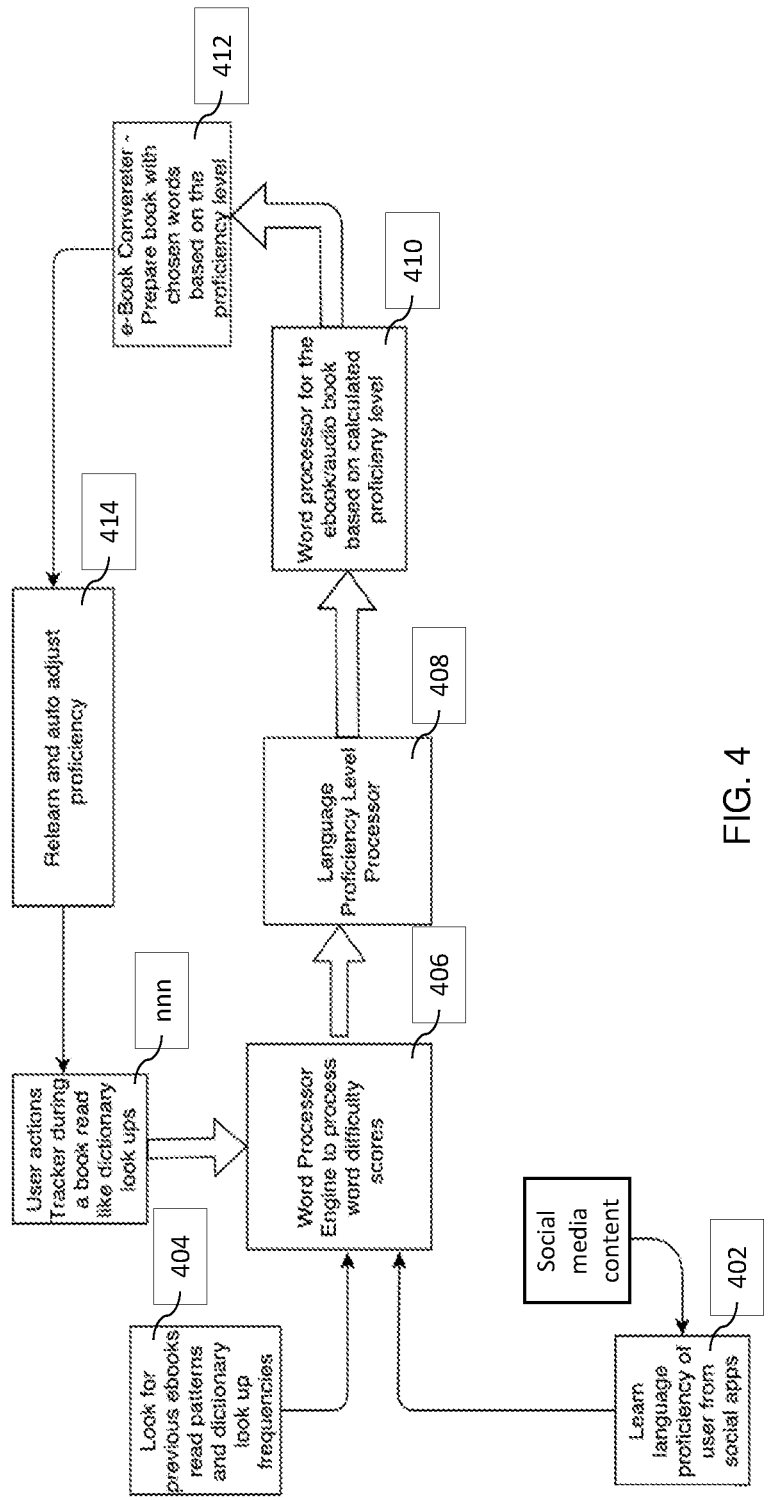
FIG. 4 is flowchart illustrating aspects of a method implemented using the aspects of the system shown in FIG. 1, for adjusting digital content to match a determined audience language proficiency level, according to embodiments of the present invention.

Now, with reference to FIG. 4, aspects of an alternate flow using the system 100 shown in FIG. 1 will be discussed. The server computer 102 at block 402 gathers language proficiency information from public social media content 108 (e.g., user entries in online postings, email comments, internet blogs, etc.). The server computer 102 at block 404 consults the user language proficiency history 110 to identify previous content consumed and associated consumption behaviors (e.g., previous reading patterns, word meaning and context queries, etc.).

The server computer 102 at block 406 processes consumption activity to identify troublesome words and associated difficulty levels. The server computer 102 at block 408 generates a language proficiency level for the user. At block 410, the server computer 102 uses Natural Language Processing (as described above) to identify replacement words having difficulty levels appropriate for the determined language proficiency and meanings similar to troublesome words. At block 412, the server computer adjusts the user content 106 with the replacement words.

According to aspects of the invention, the server computer 102 at block 414 will add current proficiency information (e.g., replacement word results, current measured proficiency level, etc.), to improve user satisfaction, content comprehension, and content retention through continued system interaction. The server computer 102 undertakes another round of consumption activity tracking at block 416, and the content adjustment routine continues at block 406. In an embodiment, the server computer 102 monitors multiple rounds of user consumption activity (or monitors ongoing consumption activity) and progressively learns the improvements in language proficiency of a reader. Aspects of the invention adjust the text and spoken words in digital content (e.g., including digital text, digital audio, and so forth) to dynamically accommodate the language proficiency of the reader/listener to match a current proficiency.

Regarding the flowcharts and block diagrams, the flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
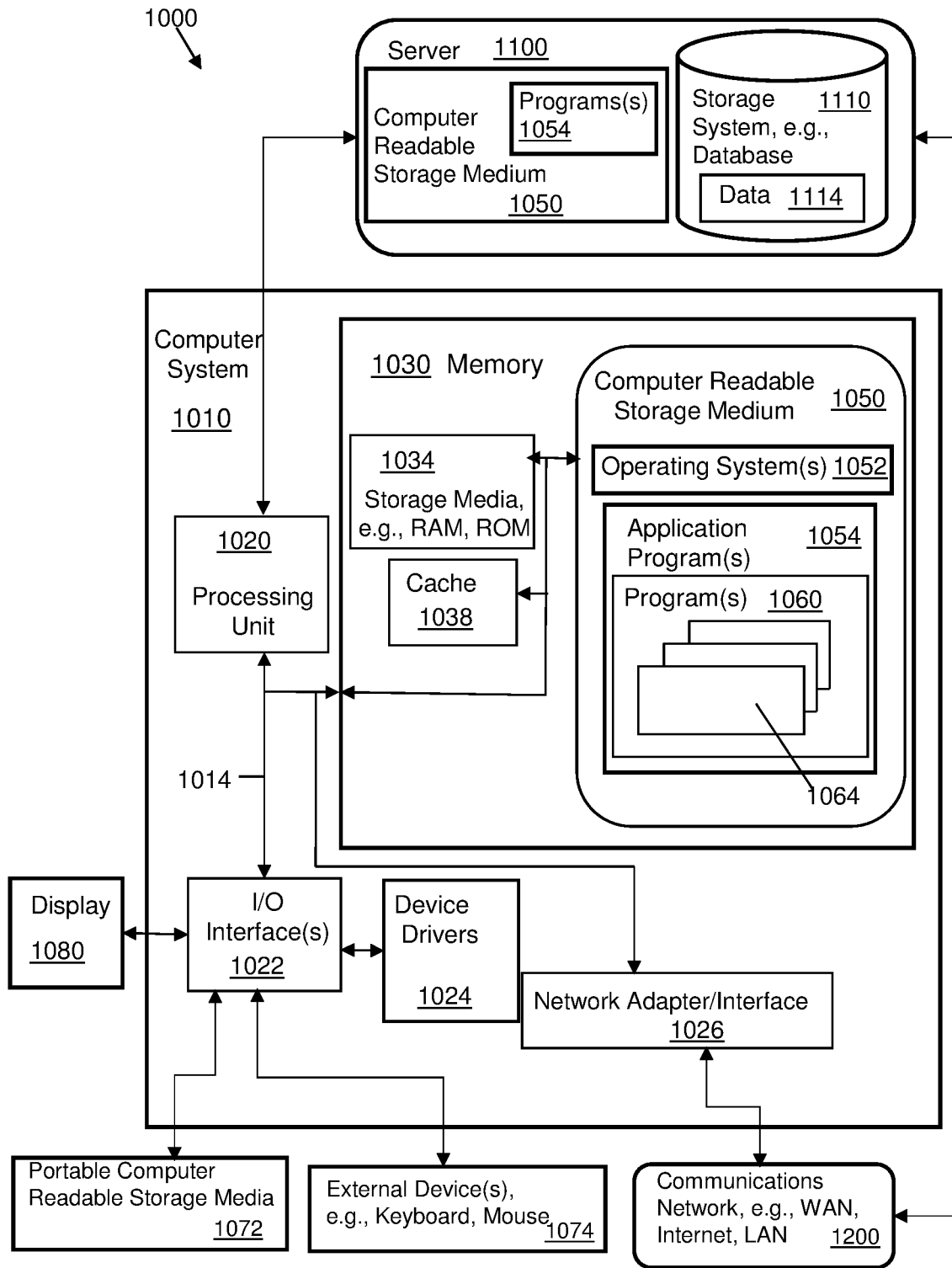
FIG. 5 is a schematic block diagram depicting a computer system according to an embodiment of the disclosure which may be incorporated, all or in part, in one or more computers or devices shown in FIG. 1, and cooperates with the systems and methods shown in FIG. 1.

Referring to FIG. 5, a system or computer environment 1000 includes a computer diagram 1010 shown in the form of a generic computing device. The method of the invention, for example, may be embodied in a program 1060, including program instructions, embodied on a computer readable storage device, or computer readable storage medium, for example, generally referred to as memory 1030 and more specifically, computer readable storage medium 1050. Such memory and/or computer readable storage media includes non-volatile memory or non-volatile storage. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure.

One or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
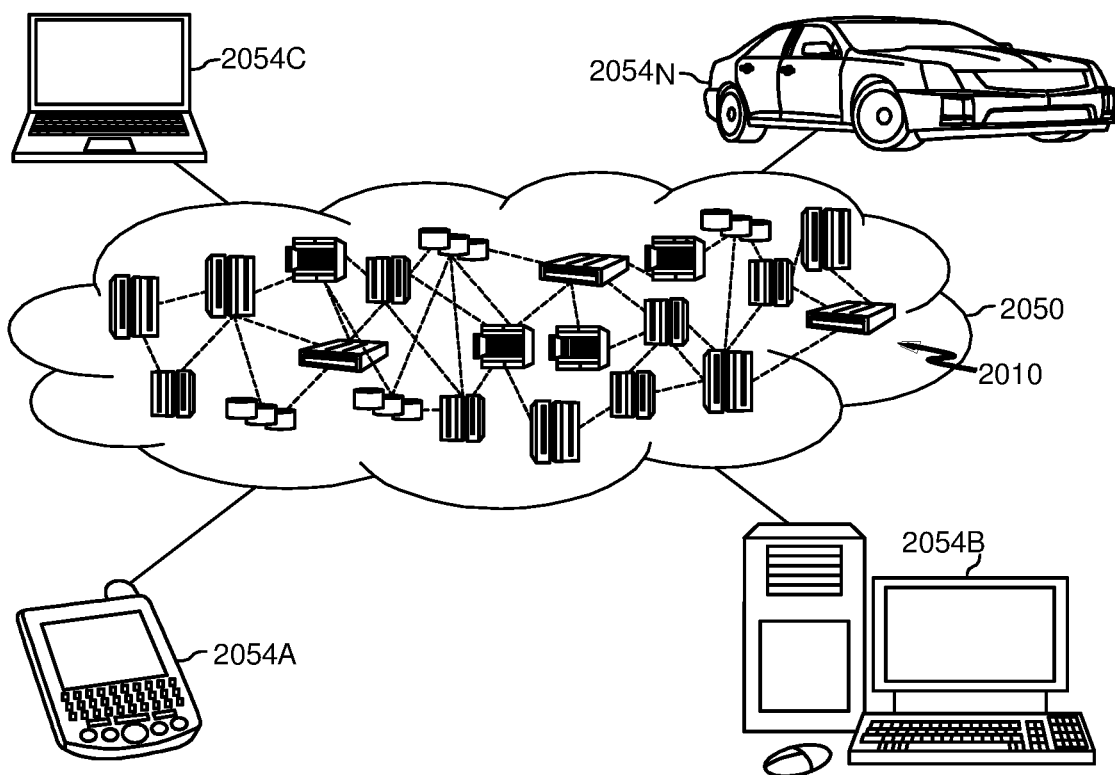
FIG. 6 depicts a cloud computing environment according to an embodiment of the present invention.

Referring now to FIG. 6, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 6 are intended to be illustrative only and that computing nodes 2010 and cloud computing environment 2050 can communicate with any type of computerized device over any type of network and/or network addressable connection (e.g., using a web browser).

Figure 7:
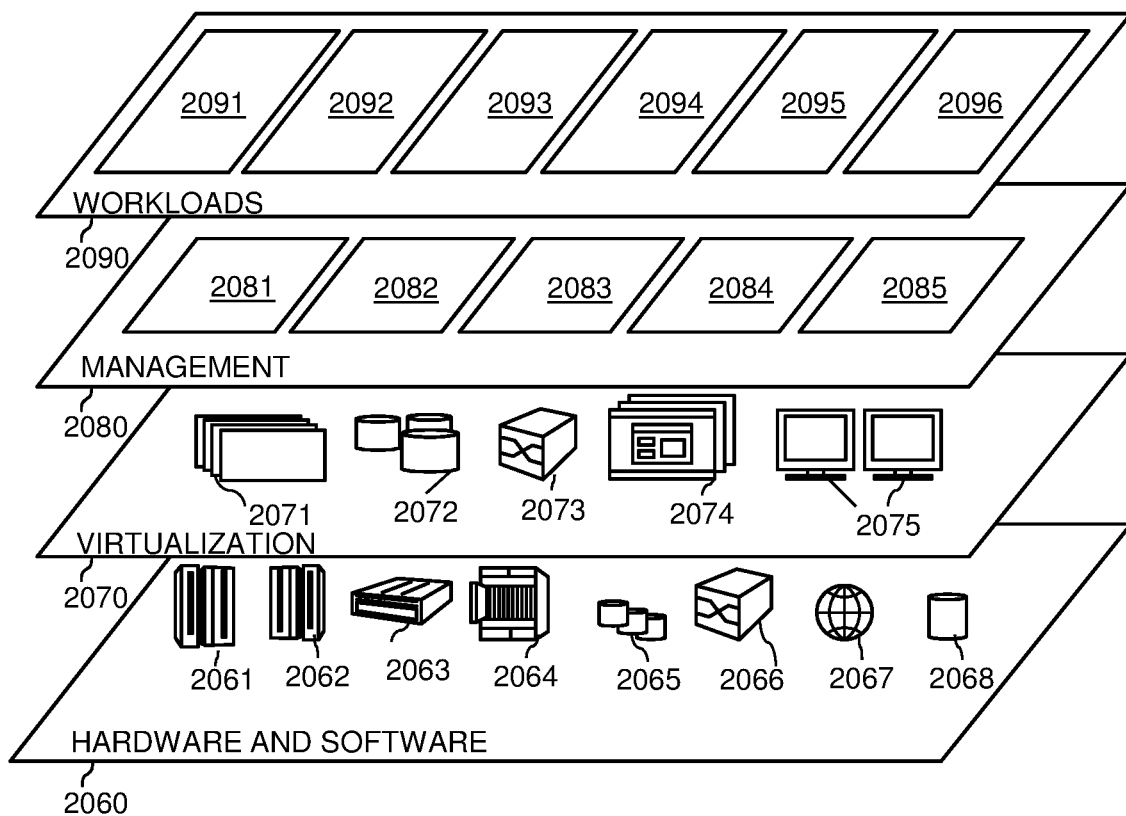
FIG. 7 depicts abstraction model layers according to an embodiment of the present invention.

Referring now to FIG. 7, a set of functional abstraction layers provided by cloud computing environment 2050 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and adjusting digital content to match a determined audience language proficiency level 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method to adjust digital content to match a determined user language proficiency level, comprising:
    receiving, by a computer, digital content including words;
    monitoring, by said computer, word consumption activity of a user;
    responsive to said monitoring, identifying by said computer, troublesome words associated with content consumption delays and establishing a user language proficiency level based, at least in part, on a difficulty value associated with said troublesome words;
    determining, using the computer, a word difficulty for the user, as at least part of the establishing of the user language proficiency level, based on the troublesome words;
    identifying, using the computer, a difficulty level associated with the troublesome words, the user language proficiency level being associated with the word difficulty;
    identifying a difficulty value associated with the troublesome words;
    basing the language proficiency level, at least in part, on the difficulty value;
    identifying as target words by said computer, words within said content that have a difficulty level above said language proficiency level;
    responsive to said target word identification, identifying by said computer, from a word corpus available to said computer, exchange candidate words having a difficulty level equal to or below said language proficiency level;
    generating, by said computer using a natural language processing (NLP) algorithm, word embeddings for said target words and said exchange candidate words;
    selecting from the exchange candidate words, replacement words having word embeddings the same as the word embeddings of said target words; and
    adjusting, by said computer, said content by replacing the target words with the replacement words.

2. The method of claim 1, further including:
    identifying, by said computer, a target word phrase within said target words;
    assembling, by said computer, exchange candidate word groups from the exchange candidate words,
    generating, by said computer using a natural language processing (NLP) algorithm, word embeddings for the target word phrase and the exchange candidate word groups;
    selecting, by said computer, from the exchange candidate word groups, a replacement word phrase having a word embedding the same as the target word phrase embedding; and
    adjusting, by said computer, said content by replacing the target word phrase with the replacement word phrase.

3. The method of claim 1, wherein said consumption delays are actions selected from a group consisting of consulting a dictionary available to said computer, consuming a selected portion of content multiple times, and spending an amount of time to consume a portion of content that exceeds a trigger threshold.

4. The method of claim 1, wherein said user language proficiency level is a value selected from a group consisting of a highest difficulty value associated with said troublesome words, a lowest difficulty value associated with said troublesome words, and an difficulty value associated with said troublesome words.

5. The method of claim 1, wherein said language proficiency level is based, at least in part, on a word difficulty level associated with social media content generated by said user and available to said computer.

6. The method of claim 1, wherein the content adjustment occurs in response to an adjustment trigger event selected from a group of events consisting of a user request, and a quantity of trigger words exceeding a predetermined trigger word quantity threshold.

7. The method of claim 1, wherein said establishing of said proficiency level is based, at least in part, on comparison to a previously-stored historic proficiency level associated with said user.

8. A system to adjust digital content to match a determined user language proficiency level, which comprises:
    a computer system comprising a computer readable storage medium having program instructions embodied therewith, the program instructions executable by a computer to cause the computer to:
    receive digital content including words;
    monitor word consumption activity of a user;
    responsive to said monitoring, identify troublesome words associated with content consumption delays and establish a user language proficiency level based, at least in part, on a difficulty value associated with said troublesome words;
    determine, using the computer, a word difficulty for the user, as at least part of the establishing of the user language proficiency level, based on the troublesome words;
    identify, using the computer, a difficulty level associated with the troublesome words, the user language proficiency level being associated with the word difficulty;
    identify a difficulty value associated with the troublesome words;
    base the language proficiency level, at least in part, on the difficulty value;

identify words within said content that have a difficulty level above said language proficiency level;

responsive to said target word identification, identify from a word corpus available to said computer, exchange candidate words having a difficulty level equal to or below said language proficiency level;

generate using a natural language processing (NLP) algorithm, word embeddings for said target words and said exchange candidate words;

select from the exchange candidate words, replacement words having word embeddings the same as the word embeddings of said target words; and adjust said content by replacing the target words with the replacement words.

9. The system of claim 8, further including instructions causing the computer to:

identify a target word phrase within said target words;

assemble exchange candidate word groups from the exchange candidate words, generate using a natural language processing (NLP) algorithm, word embeddings for the target word phrase and the exchange candidate word groups;

select from the exchange candidate word groups, a replacement word phrase having a word embedding the same as the target word phrase embedding; and adjust said content by replacing the target word phrase with the replacement word phrase.

10. The system of claim 8, wherein said consumption delays are actions selected from a group consisting of consulting a dictionary associated with the content, consuming a selected portion of content multiple times, and spending an amount of time to consume a portion of content that exceeds a trigger threshold.

11. The system of claim 8, wherein said user language proficiency level is a value selected from a group consisting of a highest difficulty value associated with said troublesome words, a lowest difficulty value associated with said troublesome words, and an difficulty value associated with said troublesome words.

12. The system of claim 8, wherein said language proficiency level is based, at least in part, on a word difficulty level associated with social media content generated by said user and available to said computer.

13. The system of claim 8, wherein the content adjustment occurs in response to an adjustment trigger event selected from a group of events consisting of a user request, and a quantity of trigger words exceeding a predetermined trigger word quantity threshold.

14. The system of claim 8, wherein said establishing of said proficiency level is based, at least in part, on comparison to a previously-stored historic proficiency level associated with said user.

15. A computer program product to adjust digital content to match a determined user language proficiency level, which comprises:

a computer system comprising a computer readable storage medium having program instructions embodied therewith, the program instructions executable by a computer to cause the computer to:

receive, using a computer, digital content including words;

monitor, using the computer, word consumption activity of a user;

responsive to said monitoring, identify, using the computer, troublesome words associated with content consumption delays and establish a user language proficiency level based, at least in part, on a difficulty value associated with said troublesome words;

determine, using the computer, a word difficulty for the user, as at least part of the establishing of the user language proficiency level, based on the troublesome words;

identify, using the computer, a difficulty level associated with the troublesome words, the user language proficiency level being associated with the word difficulty;

identify a difficulty value associated with the troublesome words;

base the language proficiency level, at least in part, on the difficulty value;

identify, using the computer, words within said content that have a difficulty level above said language proficiency level;

responsive to said target word identification, identify from a word corpus available to said computer, exchange candidate words having a difficulty level equal to or below said language proficiency level;

generate, using the computer, using a natural language processing (NLP) algorithm, word embeddings for said target words and said exchange candidate words;

select, using the computer, from the exchange candidate words, replacement words having word embeddings the same as the word embeddings of said target words; and adjust, using the computer, said content by replacing the target words with the replacement words.

16. The computer program product of claim 15, further including instructions causing the computer to:

identify, using the computer, a target word phrase within said target words;

assemble, using the computer, exchange candidate word groups from the exchange candidate words, generate, using the computer, using a natural language processing (NLP) algorithm, word embeddings for the target word phrase and the exchange candidate word groups;

select, using the computer, from the exchange candidate word groups, a replacement word phrase having a word embedding the same as the target word phrase embedding; and adjust, using the computer, said content by replacing the target word phrase with the replacement word phrase.

17. The computer program product of claim 15, wherein said consumption delays are actions selected from a group consisting of consulting a dictionary associated with the content, consuming a selected portion of content multiple times, and spending an amount of time to consume a portion of content that exceeds a trigger threshold.

18. The computer program product of claim 15, wherein said language proficiency level is based, at least in part, on a word difficulty level associated with social media content generated by said user and available to said computer.

19. The computer program product of claim 15, wherein the content adjustment occurs in response to an adjustment trigger event selected from a group of events consisting of a user request, and a quantity of trigger words exceeding a predetermined trigger word quantity threshold.

20. The computer program product of claim 15, wherein said establishing of said proficiency level is based, at least in part, on comparison to a previously-stored historic proficiency level associated with said user.

* * * * *